(12) United States Patent
Hyodo et al.

(10) Patent No.: US 9,091,221 B2
(45) Date of Patent: Jul. 28, 2015

(54) ENGINE SPEED CONTROL DEVICE FOR INDUSTRIAL VEHICLE

(75) Inventors: Koji Hyodo, Kasumigaura (JP); Masaki Yoshikawa, Kasama (JP); Tadayoshi Aoki, Ryugasaki (JP); Katsutaka Hara, Ryugasaki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 582 days.

(21) Appl. No.: 13/378,969

(22) PCT Filed: Jun. 16, 2010

(86) PCT No.: PCT/JP2010/060216
§ 371 (c)(1),
(2), (4) Date: Dec. 16, 2011

(87) PCT Pub. No.: WO2010/147151
PCT Pub. Date: Dec. 23, 2010

(65) Prior Publication Data
US 2012/0094803 A1    Apr. 19, 2012

(30) Foreign Application Priority Data

Jun. 17, 2009   (JP) ................................. 2009-144093

(51) Int. Cl.
*F02D 29/02* (2006.01)
*E02F 9/20* (2006.01)
(Continued)

(52) U.S. Cl.
CPC ............... *F02D 29/02* (2013.01); *B60W 10/02* (2013.01); *E02F 9/2025* (2013.01);
(Continued)

(58) Field of Classification Search
CPC ......... E02F 9/2025; E02F 9/26; E02F 9/2045;
A01B 79/005; A01B 69/008; F02D 41/21;
F02D 41/22; F02D 2200/501; B60W 10/02;
B60W 2710/0644; B60W 2510/182; B60W
2550/10; Y10T 477/81; Y10T 477/747;
Y10T 477/753; B60Y 2200/415
USPC ........................ 701/99, 50; 475/118; 477/183
See application file for complete search history.

(56) References Cited

U.S. PATENT DOCUMENTS 4,898,078 A    2/1990  Gage et al.
6,249,733 B1 *  6/2001  Smith .............................. 701/50
(Continued)

FOREIGN PATENT DOCUMENTS

EP    0 467 440 A1    1/1992
GB    2 342 640 A     4/2000
(Continued)

OTHER PUBLICATIONS

Japanese-language Office Action dated Jul. 17, 2012 (Three (3) pages).
(Continued)

*Primary Examiner* — James Trammell
*Assistant Examiner* — James E Stroud
(74) *Attorney, Agent, or Firm* — Crowell & Moring LLP

(57) ABSTRACT

An engine speed control device for an industrial vehicle includes an approach detector that detects an approach of the industrial vehicle to an object to be approached; and an engine speed controller that restricts an upper limit of a rotation speed of an engine when the approach detector detects an approach of the industrial vehicle to an object to be approached.

4 Claims, 13 Drawing Sheets

(51) Int. Cl.
  *E02F 9/22* (2006.01)
  *F02D 41/02* (2006.01)
  *B60W 10/02* (2006.01)

(52) U.S. Cl.
  CPC .......... *E02F 9/2246* (2013.01); *F02D 41/021* (2013.01); *F02D 41/022* (2013.01); *B60W 2510/182* (2013.01); *B60W 2550/10* (2013.01); *B60W 2710/0644* (2013.01); *B60Y 2200/415* (2013.01); *F02D 2200/501* (2013.01); *Y10T 477/747* (2015.01); *Y10T 477/753* (2015.01); *Y10T 477/81* (2015.01)

(56) References Cited

U.S. PATENT DOCUMENTS

| | | | |
|---|---|---|---|
| 6,363,632 B1 * | 4/2002 | Stentz et al. | 37/414 |
| 6,619,406 B1 * | 9/2003 | Kacyra et al. | 172/4.5 |
| 6,781,683 B2 * | 8/2004 | Kacyra et al. | 356/141.1 |
| 7,134,538 B2 * | 11/2006 | Hasegawa et al. | 192/220.1 |
| 7,477,780 B2 * | 1/2009 | Boncyk et al. | 382/165 |
| 7,509,197 B2 * | 3/2009 | Landes et al. | 701/50 |
| 8,262,540 B2 * | 9/2012 | Higaki et al. | 477/109 |
| 8,567,186 B2 * | 10/2013 | Hyodo et al. | 60/431 |
| 2004/0158355 A1 * | 8/2004 | Holmqvist et al. | 700/245 |
| 2006/0173599 A1 * | 8/2006 | Landes et al. | 701/50 |
| 2009/0111655 A1 | 4/2009 | Hatanaka | |
| 2009/0265065 A1 * | 10/2009 | Ikari | 701/50 |
| 2010/0024412 A1 * | 2/2010 | Hyodo et al. | 60/426 |
| 2010/0070146 A1 * | 3/2010 | Ishii et al. | 701/50 |
| 2010/0131122 A1 * | 5/2010 | Dersjo et al. | 701/2 |
| 2010/0138118 A1 * | 6/2010 | Tsukada et al. | 701/50 |
| 2011/0040460 A1 * | 2/2011 | Velde et al. | 701/50 |
| 2012/0271526 A1 * | 10/2012 | Oishi et al. | 701/99 |
| 2013/0311051 A1 * | 11/2013 | Torii | 701/50 |

FOREIGN PATENT DOCUMENTS

| | | | |
|---|---|---|---|
| JP | 55-56732 | | 4/1980 |
| JP | 62163872 A | * | 7/1987 |
| JP | 2-101851 U | | 8/1990 |
| JP | 4-73331 A | | 3/1992 |
| JP | 07017304 A | * | 1/1995 |
| JP | 11141669 A | * | 5/1999 |
| JP | 2001-27319 A | | 1/2001 |
| JP | 2001-263384 A | | 9/2001 |
| JP | 2001263384 A | * | 9/2001 |
| JP | 2005-299732 A | | 10/2005 |
| JP | 2007278367 A | * | 10/2007 |
| WO | WO 2007/043290 A1 | | 4/2007 |
| WO | WO 2009/054499 A1 | | 4/2009 |

OTHER PUBLICATIONS

International Search Report dated Sep. 14, 2010 (Two (2) pages).
Extended European Search Report dated Apr. 28, 2014 (five (5) pages).

* cited by examiner

ENGINE SPEED CONTROL DEVICE FOR INDUSTRIAL VEHICLE

TECHNICAL FIELD

The present invention relates to an engine speed control device for an industrial vehicle such as a wheel loader.

BACKGROUND ART

In an industrial vehicle such as a wheel loader, for example, when performing a work of loading sand, gravel, dirt, and the like into a dump truck, the vehicle is decelerated by pressing the brake pedal when approaching the dump truck and at the same time a working machine device (bucket) is lifted up by pressing the accelerator pedal, thereby maintaining the number of rotations of the engine at a high speed. Then, there is known a clutch cut off device that detects brake fluid pressure and a brake operation amount and, if the detected brake fluid pressure and the brake operation amount exceed a predetermined value, releases a forward/reverse clutch so as to cut off transmission of driving force (refer to Patent Literature 1).

CITATION LIST

Patent Literature

[PATENT LITERATURE 1] Japanese Laid-Open Patent Publication No. 2001-263384

SUMMARY OF INVENTION

Technical Problem

However, since the clutch cut off device described above can only control the forward/reverse clutch either to be in a connected state or to be in a released state, the movement of the industrial vehicle may not become smooth before and after releasing operation of the clutch. For this reason, the operator may perform a work of loading sand, gravel, dirt, and the like into a dump truck while disabling the clutch cut off. However, if, for instance, a work of loading sand and the like into a dump truck is performed in a state where clutch cut off is not performed, a wheel loader 100 needs to be decelerated or stopped against driving force that has been increased due to an increase in the number of rotations of the engine, thereby increasing fuel consumption and load on a brake unit.

Solution to Problem

An engine speed control device for an industrial vehicle according to a first aspect, comprises: an approach detector that detects an approach of the industrial vehicle to an object to be approached; and an engine speed controller that restricts an upper limit of a rotation speed of an engine when the approach detector detects an approach of the industrial vehicle to an object to be approached.

According to a second aspect of the present invention, in the engine speed control device for an industrial vehicle according to the first aspect, it is preferable that the approach detector determines that the industrial vehicle has approached an object to be approached if a forward clutch provided in a transmission of the engine of the industrial vehicle is in a connected state and it is decided that a braking force of the industrial vehicle is equal to or greater than a predetermined braking force.

According to a third aspect of the present invention, in the engine speed control device for an industrial vehicle according to the first aspect, it is preferable that the approach detector determines that the industrial vehicle has approached an object to be approached if a forward clutch provided in a transmission of the engine of the industrial vehicle is in a connected state and it is decided that a travel speed of the industrial vehicle is equal to or less than a predetermined speed and that a braking force of the industrial vehicle is equal to or greater than a predetermined braking force.

According to a fourth aspect of the present invention, in the engine speed control device for an industrial vehicle according to the first aspect, it is preferable that the approach detector determines that the industrial vehicle has approached an object to be approached if a forward clutch provided in a transmission of the engine of the industrial vehicle is in a connected state and it is decided that a height of a working machine device provided in the industrial vehicle is equal to or greater than a predetermined height and that a braking force of the industrial vehicle is equal to or greater than a predetermined braking force.

According to a fifth aspect of the present invention, in the engine speed control device for an industrial vehicle according to any one of the first to fourth aspects, it is preferable that the approach detector includes a braking force information obtaining unit that obtains information related to a magnitude of braking force of the industrial vehicle; and the engine speed controller restricts the upper limit of the rotation speed of the engine such that the upper limit of the rotation speed of the engine becomes lower with an increase in the braking force if the information obtained by the braking force information obtaining unit falls within a predetermined range.

According to a sixth aspect of the present invention, in the engine speed control device for an industrial vehicle according to the fifth aspect, it is preferable that, based upon the information obtained by the braking force information obtaining unit, the engine speed controller does not restrict the upper limit of the rotation speed of the engine when it is determined that the braking force is equal to or less than a predetermined braking force, whereas the engine speed controller restricts the upper limit of the rotation speed of the engine such that the upper limit of the rotation speed of the engine becomes lower with an increase in the braking force when it is determined that the braking force exceeds a predetermined braking force.

According to a seventh aspect of the present invention, in the engine speed control device for an industrial vehicle according to the first to sixth aspects, it is preferable to further comprise: a clutch that connects/cuts off between a power source and driving wheels; a clutch cut off valve that releases the clutch; and a selector that is capable of selecting drive/non-drive of the clutch cut off valve, and it is preferable that the engine speed controller restricts the upper limit of the rotation speed of the engine in a state where the selector has selected non-drive of the clutch cut off valve.

According to an eighth aspect of the present invention, in the engine speed control device for an industrial vehicle according to the seventh aspect, it is preferable that in a state where the selector has selected drive of the clutch cut off valve, the clutch is released by the clutch cut off valve when the approach detector detects an approach of the industrial vehicle to an object to be approached.

Advantageous Effect of the Invention

According to the present invention, fuel consumption and load on a brake unit can be controlled.

DESCRIPTION OF EMBODIMENTS

Figure 1:
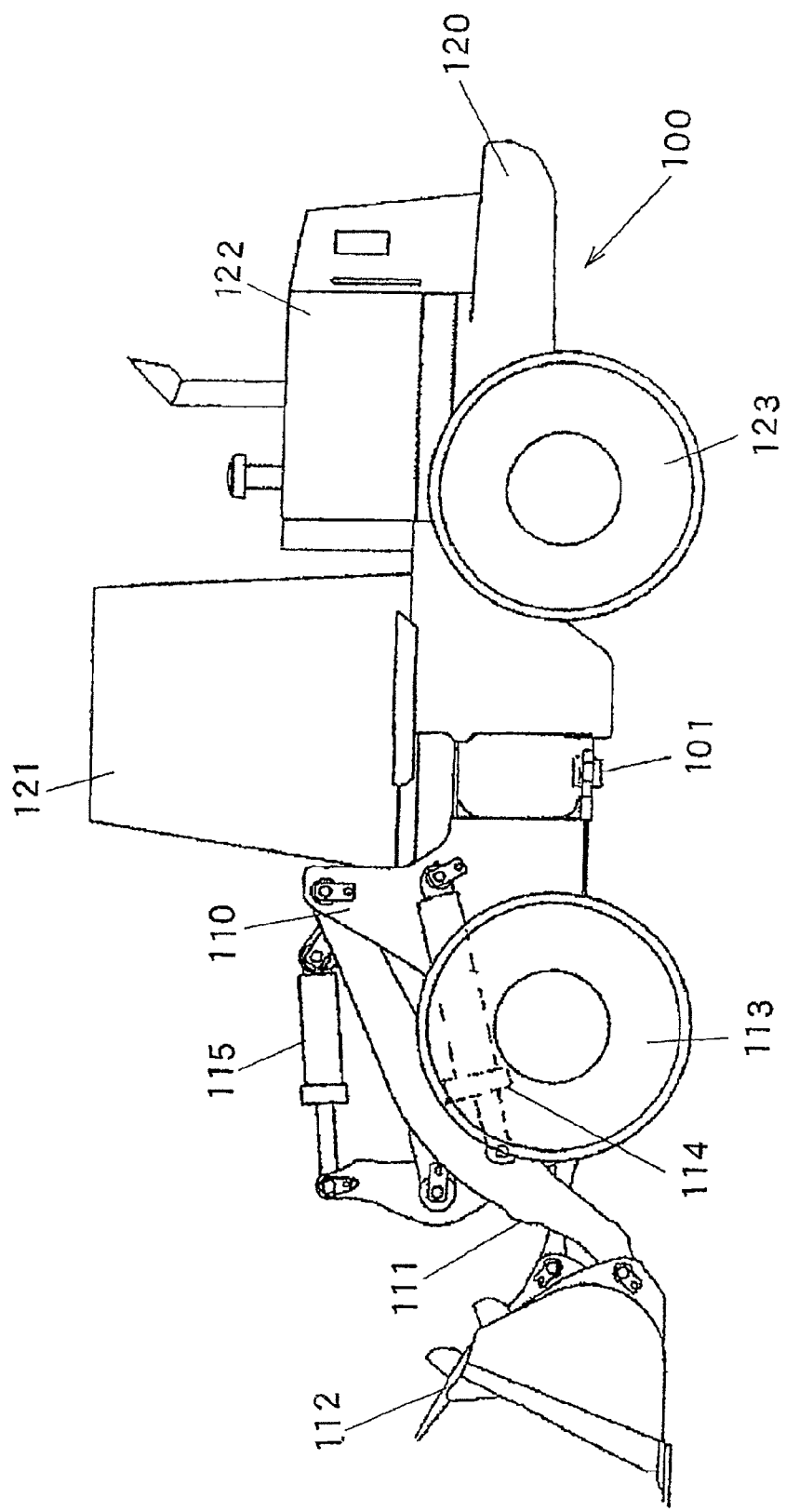
[FIG. 1] A side view of a wheel loader that is an example of an industrial vehicle.

An embodiment of an engine speed control device for an industrial vehicle according to the present invention will now be explained with reference to FIGS. 1 to 10. FIG. 1 is a side view of a wheel loader that is an example of an industrial vehicle to which the engine speed control device according to the present embodiment is applied. The wheel loader 100 is constituted with a front body 110 including an arm 111, the bucket 112, which is a working machine device, front wheels 113, and the like and a rear body 120 including a driver cabin 121, an engine bay 122, rear wheels 123, and the like. The arm 111 vertically rotates (articulates up and down) on actuation of an arm cylinder 114 and the bucket 112 vertically rotates (dump or crowd) on actuation of a bucket cylinder 115. The front body 110 and the rear body 120 are rotatably connected with each other through a center pin 101, so that the front body 110 swings side to side with respect to the rear body 120 by expansion and contraction of a steering cylinder (not shown in the figures).

Figure 2:
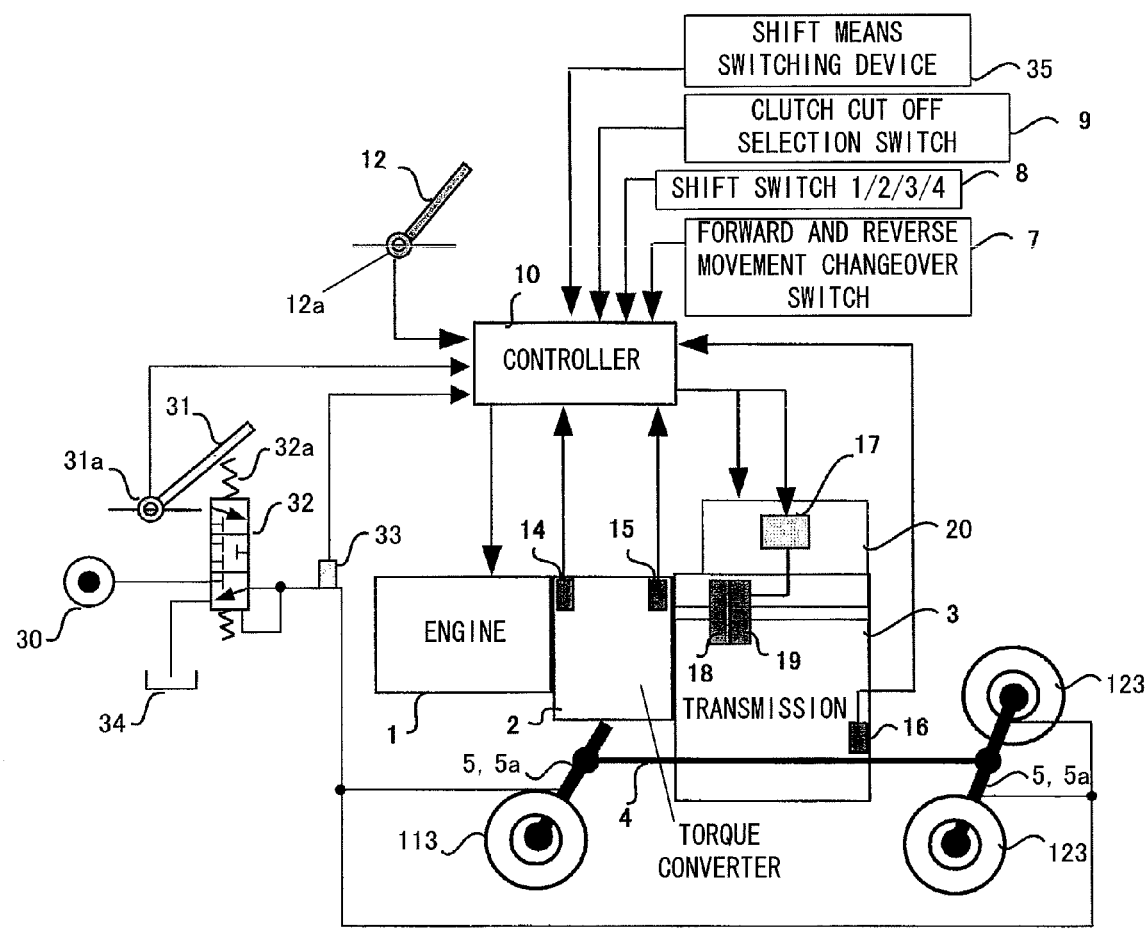
[FIG. 2] A diagram showing an outline structure of a wheel loader 100.

FIG. 2 is a diagram showing an outline structure of the wheel loader 100. An input shaft (21 of FIG. 3) of the torque converter 2 is connected to an output shaft of the engine 1, and an output shaft (22 of FIG. 3) of the torque converter 2 is connected to a transmission 3. The torque converter 2 is a fluid clutch device constituted with a well known impeller, a turbine, and a stator, and rotation of the engine 1 is transmitted to the transmission 3 through the torque converter 2. The transmission 3 includes hydraulic clutches that shift speed steps between the first speed and the fourth speed as described later, and rotation of the output shaft of the torque converter 2 is shifted by the transmission 3. The shifted rotation is transmitted to the front wheels 113 and rear wheels 123 through a propeller shaft 4 and axles 5 and thus the wheel loader travels.

The axles 5 are each provided with a brake unit 5a for decelerating and stopping the wheel loader 100. When supplied with brake fluid (hydraulic oil) through a brake valve 32, the brake unit 5a generates braking force according to the pressure of hydraulic oil. The brake valve 32 is a pressure reducing valve that reduces the pressure of hydraulic oil supplied from a hydraulic source 30 to a pressure according to compression force of a spring 32a. When the operator depresses a brake pedal 31 provided in the driver cabin 121, the spring 32a is compressed according to pressing force on the brake pedal 31. Thus, the brake valve 32 reduces the pressure of hydraulic oil supplied from the hydraulic source 30 to a pressure according to pressing force on the brake pedal 31. The brake valve 32 adjusts the pressure of hydraulic oil so that a higher pressure hydraulic oil is supplied to the brake unit 5a as the compression force of the spring 32a (i.e., pressing force on the brake pedal 31) becomes higher. A reference numeral 34 denotes a hydraulic oil reservoir.

It is to be noted that a work hydraulic pump not shown in the figures is driven by the engine 1 and discharged oil from this hydraulic pump is guided to a work actuator (e.g., the arm cylinder 114) through a directional control valve not shown in the figures. The directional control valve is driven by an operation of an operating lever not shown in the figures so that the actuator is driven according to an operation amount of the operating lever.

The torque converter 2 has a function to increase an output torque with respect to an input torque, i.e., a function to make the torque ratio 1 or greater. The torque ratio decreases with an increase in the torque converter speed ratio e (=Nt/Ni), which is a ratio of the number of rotations Nt of an output shaft 22 to the number of rotations Ni of an input shaft 21 of the torque converter 2. For instance, if travel load is increased while the vehicle is in motion in a state where the engine speed is constant, the number of rotations of the output shaft 22 of the torque converter 2, i.e., the vehicle speed is reduced and the torque converter speed ratio e is decreased. At this time, the torque ratio is increased and thus the vehicle is allowed to travel with a greater travel driving force (traction force).

Figure 3:
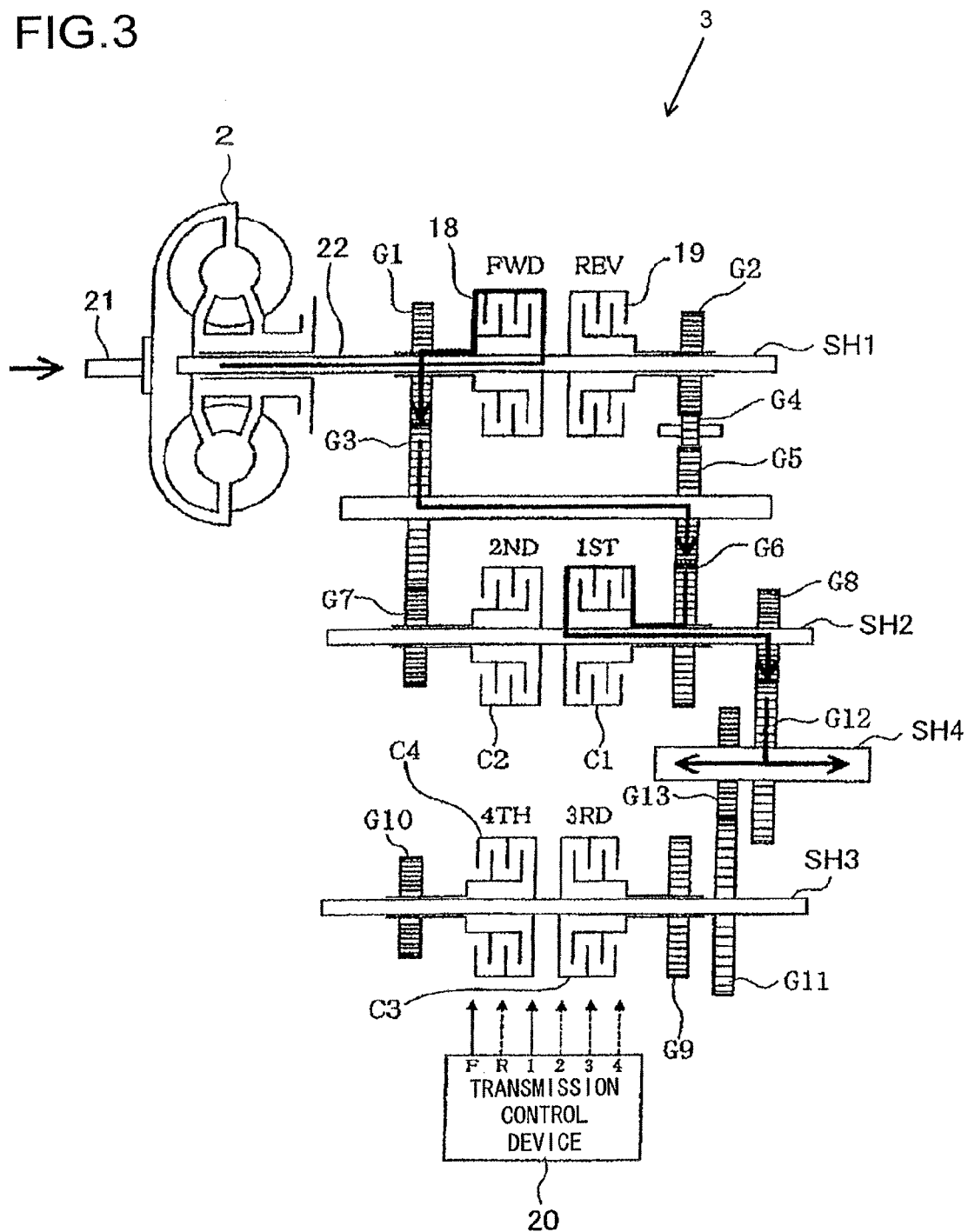
[FIG. 3] A diagram showing an outline structure of a transmission 3.

The structure of the transmission 3 will now be explained. FIG. 3 is a diagram showing an outline structure of the transmission 3. The transmission 3 includes a plurality of clutch shafts SH1 to SH3, an output shaft SH4, a plurality of gears G1 to G13, a hydraulic clutch (forward clutch) 18 for forward movement, a hydraulic clutch (reverse clutch) 19 for reverse movement, and hydraulic clutches C1 to C4 for the first to the fourth speeds. The hydraulic clutches 18, 19, and C1 to C4 are each engaged or released by pressurized oil (clutch pressure) supplied via a transmission control device 20. More specifically, the clutches 18, 19, and C1 to C4 are engaged when the clutch pressure supplied to the hydraulic clutches 18, 19, and C1 to C4 is increased, and they are released when the clutch pressure is reduced.

The output shaft 22 of the torque converter 2 is connected to the clutch shaft SH1, and the both ends of the output shaft SH4 are connected to the axles 5 of the front and the rear of the vehicle through the propeller shaft 4 of FIG. 2. In FIG. 3, the forward clutch 18 and the clutch C1 for the first speed are in an engaged state, and the other clutches 19 and C2 to C4 are in a released state. In this case, the gear G1 and the clutch shaft SH1 rotate together and the gear G6 and the clutch shaft SH2 rotate together.

At this time, output torque of the engine 1 is, as indicated by the thick line in FIG. 3, transmitted to the output shaft SH4 through the input shaft 21 and the output shaft 22 of the torque converter 2, the clutch shaft SH1, the forward clutch 18, the gears G1, G3, G5, and G6, the clutch C1 for the first speed, the clutch shaft SH2, and the gears G8 and G12. This enables travel in the first speed.

To shift from the first speed to the second speed, the clutch C1 for the first speed is released and the clutch C2 for the second speed is engaged by clutch pressure supplied through the transmission control device 20. Due to this, output torque of the engine 1 is transmitted to the output shaft SH4 through the input shaft 21 and the output shaft 22 of the torque converter 2, the clutch shaft SH1, the forward clutch 18, the gears G1, G3, and G7, the clutch C2 for the second speed, the clutch shaft SH2, and the gears G8 and G12, thereby enabling travel in the second speed. The speed step shifts other than that from the first speed to the second speed, i.e., speed step shifts from the second speed to the third speed, from the third speed to the fourth speed, from the fourth speed to the third speed, from the third speed to the second speed, and from the second speed to the first speed, are also performed by controlling the clutches C1 to C4.

There are two types of automatic transmission control, i.e., torque converter speed ratio reference control, in which the speed step is shifted when the torque converter speed ratio e reaches a predetermined value, and vehicle speed reference control, in which the speed step is shifted when the vehicle speed reaches a predetermined value. In the present embodiment, the speed step of the transmission 3 is controlled through the torque converter speed ratio reference control.

Figure 4:
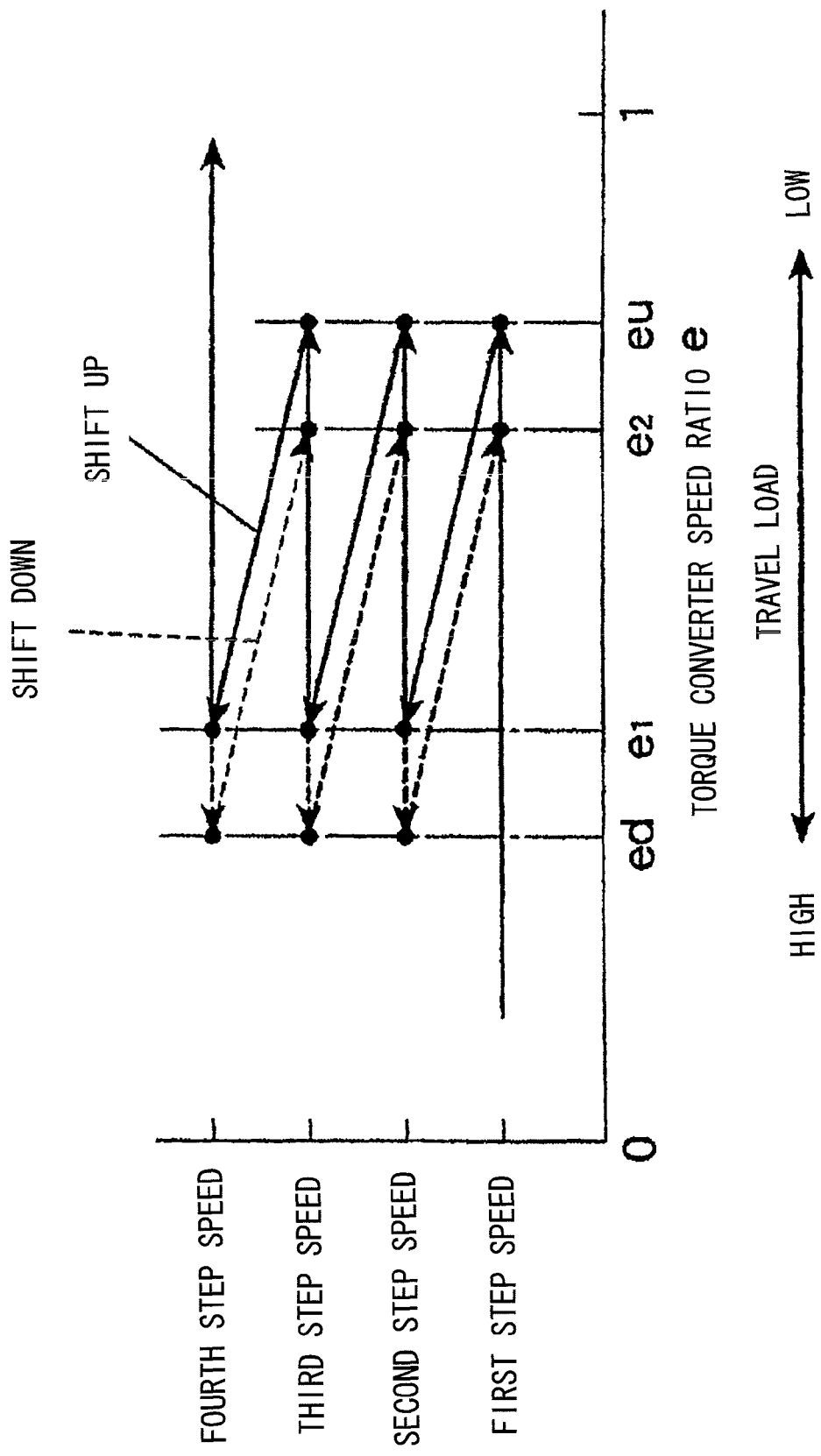
[FIG. 4] A graph showing a relationship between a torque converter speed ratio e and a speed step.

FIG. 4 is a graph showing a relationship between the torque converter speed ratio e and the speed step. When travel load is reduced and the torque converter speed ratio e is increased equal to or greater than a predetermined value eu, the speed step is shifted up by one step. This causes the torque converter speed ratio e to be e1 (ed<e1<eu). On the other hand, when travel load is increased and the torque converter speed ratio e is reduced equal to or less than a predetermined value ed, the speed step is shifted down by one step. This causes the torque converter speed ratio e to be e2 (ed<e2<eu). The predetermined values eu and ed are to be set in a controller 10 in advance.

The controller 10 shown in FIG. 2 includes an arithmetic processing unit having a CPU, a ROM, a RAM, other peripheral circuits, and the like. The controller 10 is connected with a pedal operation amount detector 12a that detects an operation amount of the accelerator pedal 12, a rotation speed detector 14 that detects the number of rotations Ni of the input shaft 21 of the torque converter 2, a rotation speed detector 15 that detects the number of rotations Nt of the output shaft 22 of the torque converter 2, and a vehicle speed detector 16 that detects a rotational speed of an output shaft of the transmission 3, i.e., a vehicle speed v. The controller 10 is connected with a forward and reverse movement changeover switch 7 that instructs forward and reverse movements of the vehicle, a shift switch 8 that instructs a maximum speed step between the first speed step and the fourth speed step, a clutch cut off selection switch 9 that selects whether or not to perform clutch cut off (described later), and a shift means switching device 35 that switches whether the speed shift is automatically performed or manually performed in the transmission 3.

The controller 10 is connected with a pedal operation amount detector 31a that detects an operation amount of the brake pedal 31 and a pressure sensor 33 that detects pressure of hydraulic oil to be supplied to the brake units 5a. The controller 10 controls the rotational speed (or the number of rotations) of the engine 1 according to an operation amount of the accelerator pedal 12.

For example, when the wheel loader 100 performs a work of loading earth, sand and the like into a dump truck, the operator depresses the brake pedal 31 when approaching the dump truck so as to decelerate the wheel loader 100, and at the same time, the operator also depresses the accelerator pedal 12 so as to lift up the bucket 112, thereby maintaining the rotation speed of the engine 1 at a high speed. When the clutch cut off selection switch 9 is set so as to perform clutch cut off, the controller 10 outputs to the transmission control device 20 a control signal (cut off signal) for releasing (cutting off) the clutches for forward and reverse movements 18 and 19 if the pressure of hydraulic oil (the brake fluid pressure Plb) detected by the pressure sensor 33 exceeds a predetermined value (a brake fluid pressure cut off threshold value Ps). When the transmission control device 20 receives a cut off signal, a clutch cut off valve 17 (FIG. 2) provided in the transmission control device 20 reduces clutch pressures at the clutches 18 and 19. This causes the clutches 18 and 19 to be released and transmission of travel driving force (hereinafter, simply referred to as driving force) to be interrupted.

It is referred to as clutch cut off that the clutches 18 and 19 are released so that connection between the engine that drives the input shaft 21 of the torque converter 2 and the propeller shaft 4 connected to the output shaft SH4 of the transmission 3 is interrupted.

It is to be noted that when the clutch cut off selection switch 9 is set so as not to perform clutch cut off, the controller 10 does not output a cut off signal even if the brake fluid pressure Plb detected by the pressure sensor 33 exceeds the brake fluid pressure cut off threshold value Ps. As a result, when the clutch cut off selection switch 9 is set so as not to perform clutch cut off, the clutch cut off described above is not performed.

Figure 5:
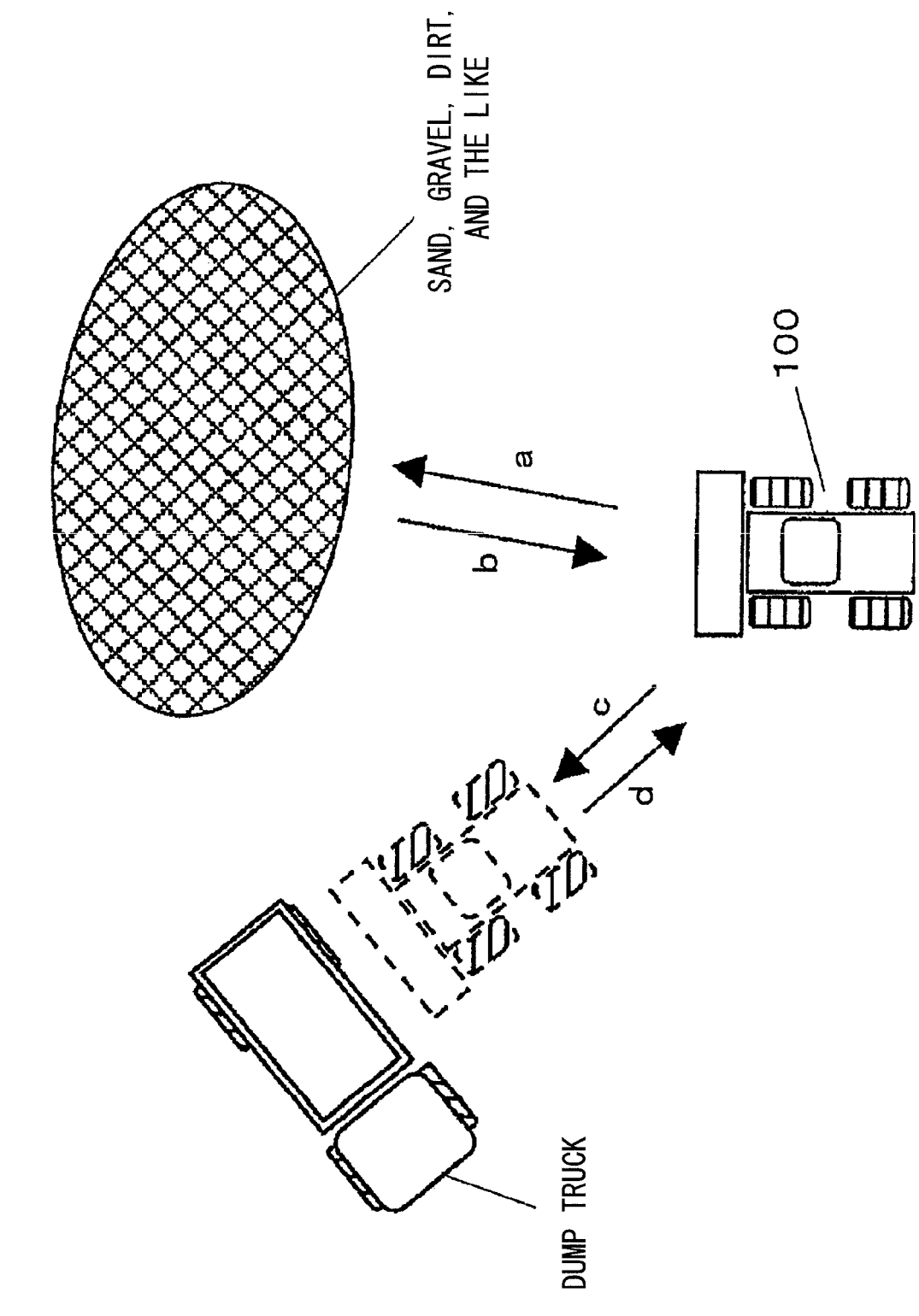
[FIG. 5] An illustration showing V-shaped loading.

FIG. 5 is an illustration showing V-shaped loading, which is one of the methods to load sand, gravel, dirt, and the like into a dump truck. In V-shaped loading, at first, as indicated by an arrow a, the wheel loader 100 moves forward and scoops sand and the like, and then, as indicated by an arrow b, the wheel loader 100 moves backward once. Then, as indicated by an arrow c, the wheel loader 100 moves forward to the dump truck and loads the scooped sand and the like into the dump truck, and, as indicated by an arrow d, the wheel loader 100 moves backward to its original position.

Loading of sand and the like into the dump truck as indicated by the arrow c of FIG. 5 does not require as great of a driving force as would be required for digging. Therefore, the operator either sets the maximum speed step to the second speed step using the shift switch 8 or selects the manual speed shift in the transmission 3 using the shift means switching device 35 and sets the speed step to be fixed to the second speed step.

Figure 6:
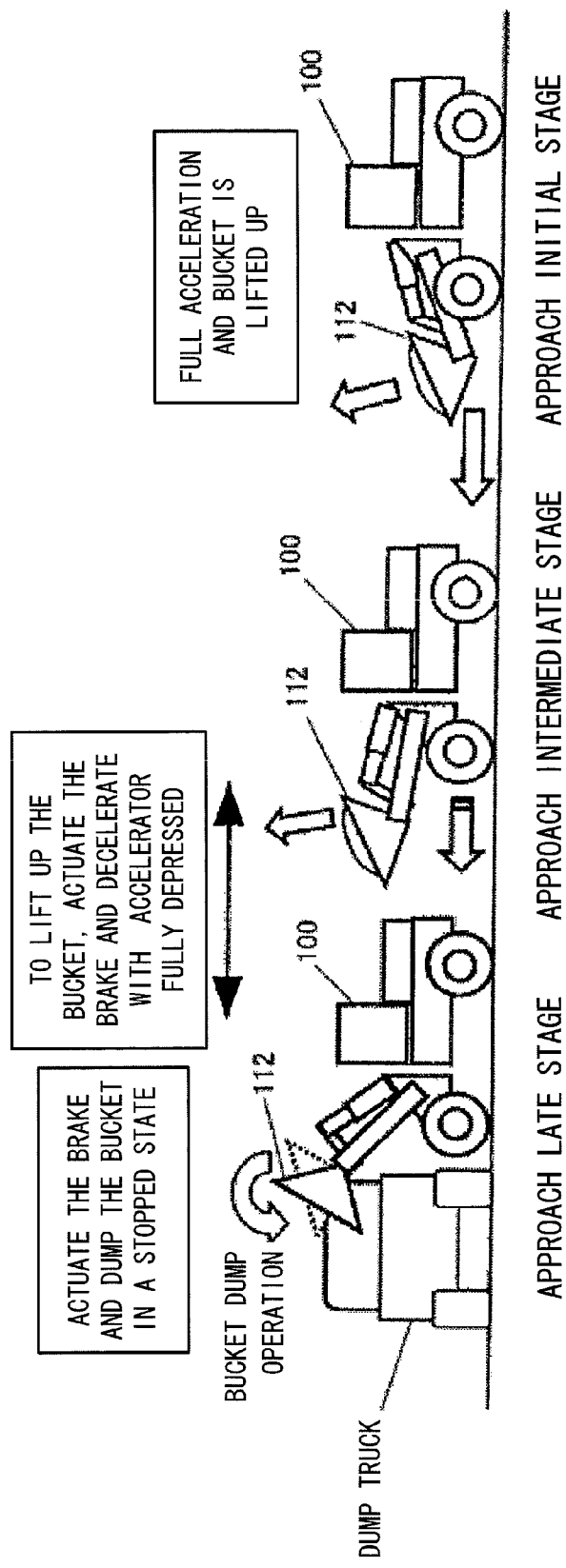
[FIG. 6] An illustration explaining a state of the wheel loader 100 when loading sand, gravel, dirt, and the like into a dump truck.

FIG. 6 is an illustration explaining a state of the wheel loader 100 at the time of the loading of sand and the like into a dump truck as shown by the arrow c of FIG. 5. For ease of comprehension, an initial stage of an approach to a dump truck that is an object to be approached, where the wheel loader 100 is accelerated, is referred to as an approach initial stage. A stage of the approach to the dump truck, from when the wheel loader 100 starts to be decelerated to when the wheel loader 100 is stopped, is referred to as an approach intermediate stage. A stage from when the wheel loader 100 is stopped to when the wheel loader 100 finishes dumping sand and the like in the bucket 112 into the dump truck is referred to as an approach late stage.

At the approach initial stage, the accelerator pedal 12 is fully depressed in order to accelerate the wheel loader 100 and lift up the bucket 112. At the approach intermediate stage, while the accelerator pedal 12 is fully depressed in order to lift up the bucket 112, the brake pedal 31 is gradually depressed in order to decelerate the wheel loader 100. At the approach late stage, the brake pedal 31 is fully depressed in order to stop the wheel loader 100. If the clutch cut off selection switch 9 is set so as to perform clutch cut off, the clutch cut off is performed by the operator depressing the brake pedal 31 at the approach intermediate stage as described above.

Figure 9:
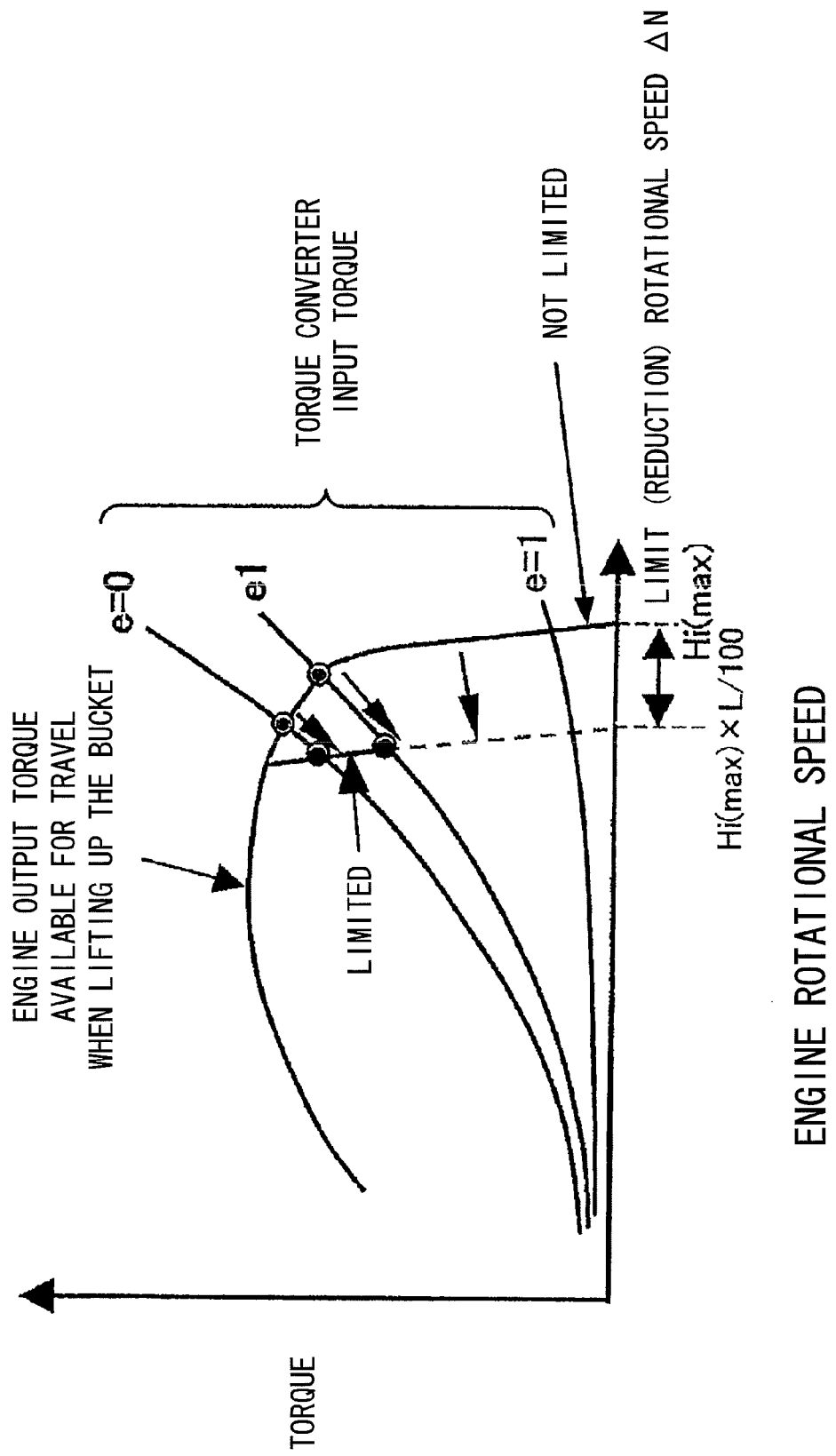
[FIG. 9] A graph showing a torque curve of an engine 1 that can be used as driving force of the wheel loader 100 when a bucket 112 is lifted up and, a curve of input torque to a torque converter 2.

Thus, since transmission of driving force is interrupted when approaching the dump truck, there is no need to decelerate and stop the wheel loader 100 against the driving force. This reduces load on the brake unit 5a, inhibits temperature rise in the brake unit 5a, and inhibits wear of each section of the brake unit 5a, compared with those when the wheel loader 100 is decelerated and stopped against the driving force without performing the clutch cut off. In addition, even if the wheel loader 100 is decelerated and stopped while maintaining a state in which the rotation speed of the engine 1 is high, the torque converter speed ratio e, which is a ratio of the number of rotations of the output shaft 22 and the input shaft 21, enters a state of e≈1 (e nearly equal 1), and, as shown in FIG. 9, input torque to the torque converter 2 is reduced. In a state where the wheel loader 100 is stopped, input power to the torque converter 2 (input torque to the torque converter 2×the number of rotations of the input shaft 21) becomes power loss. Hence, power loss in the torque converter 2 is reduced, thereby reducing fuel consumption.

However, since clutch cut off causes transmission of driving force to be interrupted suddenly, driving force of the wheel loader 100 is reduced suddenly, which may induce pitching of the wheel loader 100. For instance, during a work of loading sand and the like, the bucket 112 is at a high position, and therefore pitching tends to be greater. For this reason, an operator who dislikes pitching may prevent the clutch cut off described above by setting the clutch cut off selection switch 9 not to perform clutch cut off when performing a work of loading sand and the like into a dump truck with a conventional wheel loader.

In this case, although the pitching as described above may not be induced, wear of each section of the brake units 5a and an increase in power loss at the torque converter 2 are to be caused. For this reason, the wheel loader 100 of the present embodiment is configured to restrict an upper limit of the rotation speed of the engine 1, i.e., the number of rotations of the input shaft 21 of the torque converter 2 so as to limit (reduce) the maximum rotational speed of the engine 1 when the clutch cut off selection switch 9 is set so as not to perform clutch cut off and an approach to a dump truck or the like in order to load sand and the like is detected in a manner described later.

Figure 7:
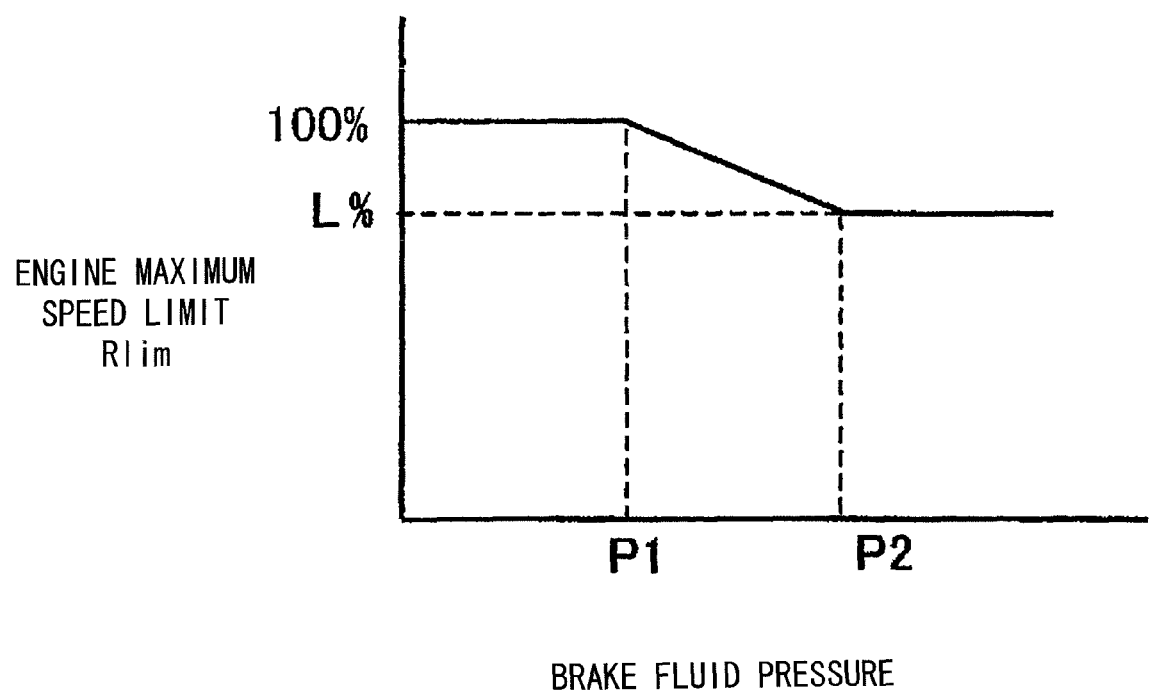
[FIG. 7] A graph showing a relationship between a brake fluid pressure Plb and a maximum engine speed limit Rlim.

More specifically, when the forward clutch 18 is in a connected state, the controller 10 limits the maximum rotational speed of the engine 1 as shown in FIG. 7 according to braking force at the brake units 5a (e.g., according to the brake fluid pressure Plb detected by the pressure sensor 33). In other words, upon setting the clutch cut off selection switch 9 so as not to perform clutch cut off and making a decision that the brake fluid pressure Plb has exceeded a predetermined pressure value P1, the controller 10 makes a decision that the wheel loader 100 is approaching a dump truck or the like so as to load sand and the like and gradually decreases the engine maximum speed limit Rlim as the brake fluid pressure Plb detected by the pressure sensor 33 becomes higher up to a predetermined pressure value P2, which is a value higher than the pressure value P1. Upon setting the clutch cut off selection switch 9 so as not to perform clutch cut off and making a decision that the brake fluid pressure Plb has exceeded the predetermined pressure value P2, the controller 10 sets the engine maximum speed limit Rlim to L (%). It is to be noted that even if the clutch cut off selection switch 9 has been set so as not to perform clutch cut off, upon making a decision that the brake fluid pressure Plb is equal to or less than the predetermined pressure value P1, the controller 10 does not limit a limit value (the engine maximum speed limit Rlim) of the maximum rotational speed of the engine 1.

Here, the pressure value P2 is assumed, for instance, to be a brake fluid pressure that generates braking force sufficient to retain the vehicle speed of the wheel loader 100 at a human walking speed even if the accelerator pedal 12 is fully depressed. More specifically, the pressure value P2 may be a brake fluid pressure that generates braking force sufficient to retain the vehicle speed of the wheel loader 100, for example, at equal to or less than 3 km/h when the accelerator pedal 12 is fully pressed. In addition, the pressure value P1 is a value approximately 50% of the pressure value P2, for instance.

If the value of L is too high, limiting of the engine maximum speed limit Rlim becomes less effective. If the value of L is too low, output of the engine 1 is reduced unnecessarily, thereby reducing the driving force of the wheel loader 100 too much and reducing the lifting speed of the bucket 112 too much. Thus, L is set to, for instance, approximately 70 to 85% of the rotational speed when the engine maximum speed limit Rlim is not limited (100%).

Figure 8:
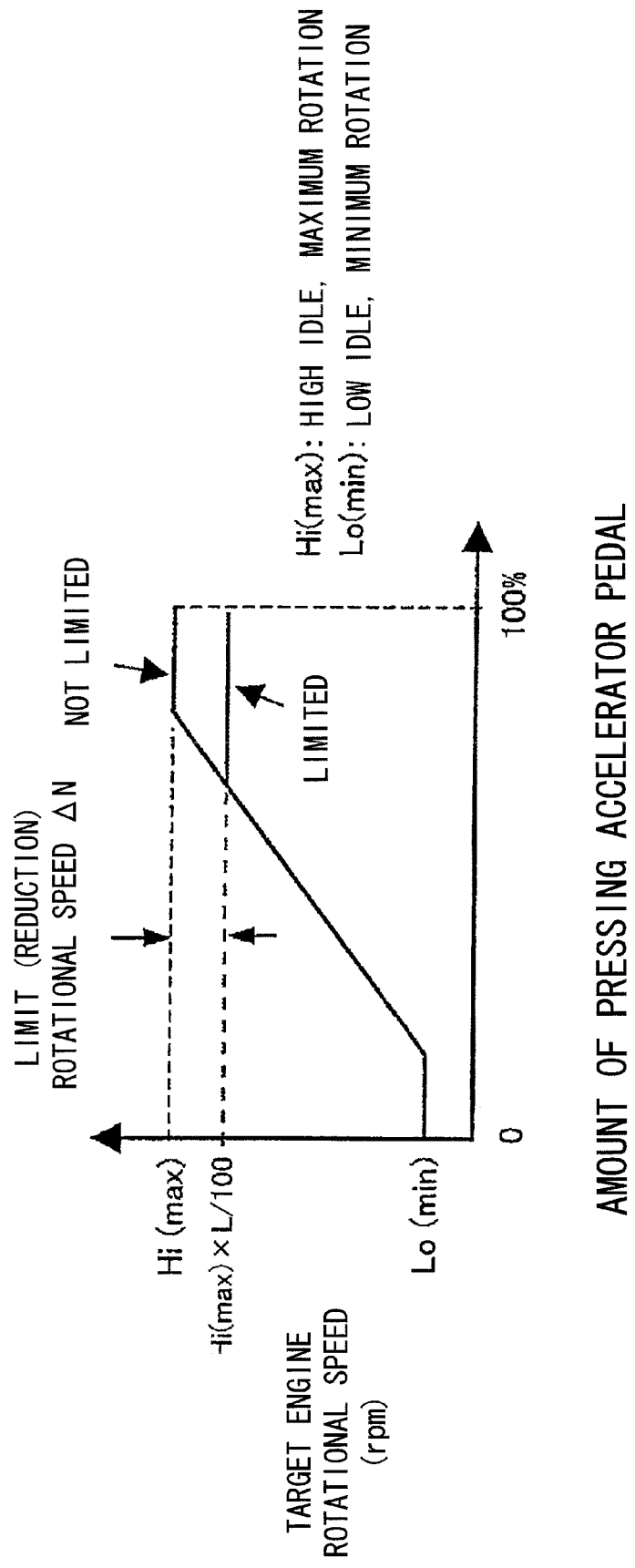
[FIG. 8] A graph showing a target engine speed with respect to an amount of pressing of an accelerator pedal 12.

FIG. 8 is a graph showing a target engine rotational speed with respect to a depressing amount of the accelerator pedal 12. Where the engine maximum speed limit Rlim is not limited (indicated as "not limited" in the figure), the target engine rotational speed is changed from a low idle (Lo (min)), which is the minimum number of rotations, to a high idle (Hi (max)), which is the maximum number of rotations, in accordance with the depressing amount of the accelerator pedal 12. Where the engine maximum speed limit Rlim is limited (indicated as "limited" in the figure), the target engine rotational speed is increased from the Lo (min) with an increase in the depressing amount of the accelerator pedal 12 to an upper limit value which is a value obtained by multiplying the Hi (max) by L/100.

FIG. 9 is a graph showing a torque curve of the engine 1 that can be used as driving force of the wheel loader 100 when the bucket 112 is lifted up, and curves of input torque to the torque converter 2. The intersection of a torque curve of the engine 1 and an input torque curve of the torque converter 2 is an input torque that is actually input to the torque converter 2 for the wheel loader 100 to travel. Input torque to the torque converter 2 increases proportionally with the square of the number of rotations Ni (i.e., a rotational speed of the engine 1) of the input shaft 21 of the torque converter 2. Hence, when the engine maximum speed limit Rlim is limited or reduced, the input torque to the torque converter 2 is reduced compared to when it is not limited. More specifically, in FIG. 9, the intersection of the torque curve of the engine 1 and each input torque curve of the torque converter 2 is shifted to the lower left.

Input power to the torque converter 2 (i.e., output of the engine 1) is represented by the product of input torque to the torque converter 2 and the number of rotations Ni of the input shaft 21 (i.e., a rotational speed of the engine 1). Power loss at the torque converter 2 is expressed by the following expression (1).

$$(\text{Power loss}) = (\text{Input power to the torque converter 2}) \times (1-\eta) \qquad (1)$$

η denotes transmission efficiency of power at the torque converter 2.

Thus, when the engine maximum speed limit Rlim is limited, the input torque to the torque converter 2 is reduced compared to when it is not limited and power loss at the torque converter 2 is reduced. In addition, when the engine maximum speed limit Rlim is limited, driving force when approaching the dump truck is inhibited or reduced compared to when it is not limited, thereby reducing load on the brake units 5a, inhibiting temperature rise in the brake unit 5a, and reducing wear at each component of the brake units 5a.

—Flowchart—

Figure 10:
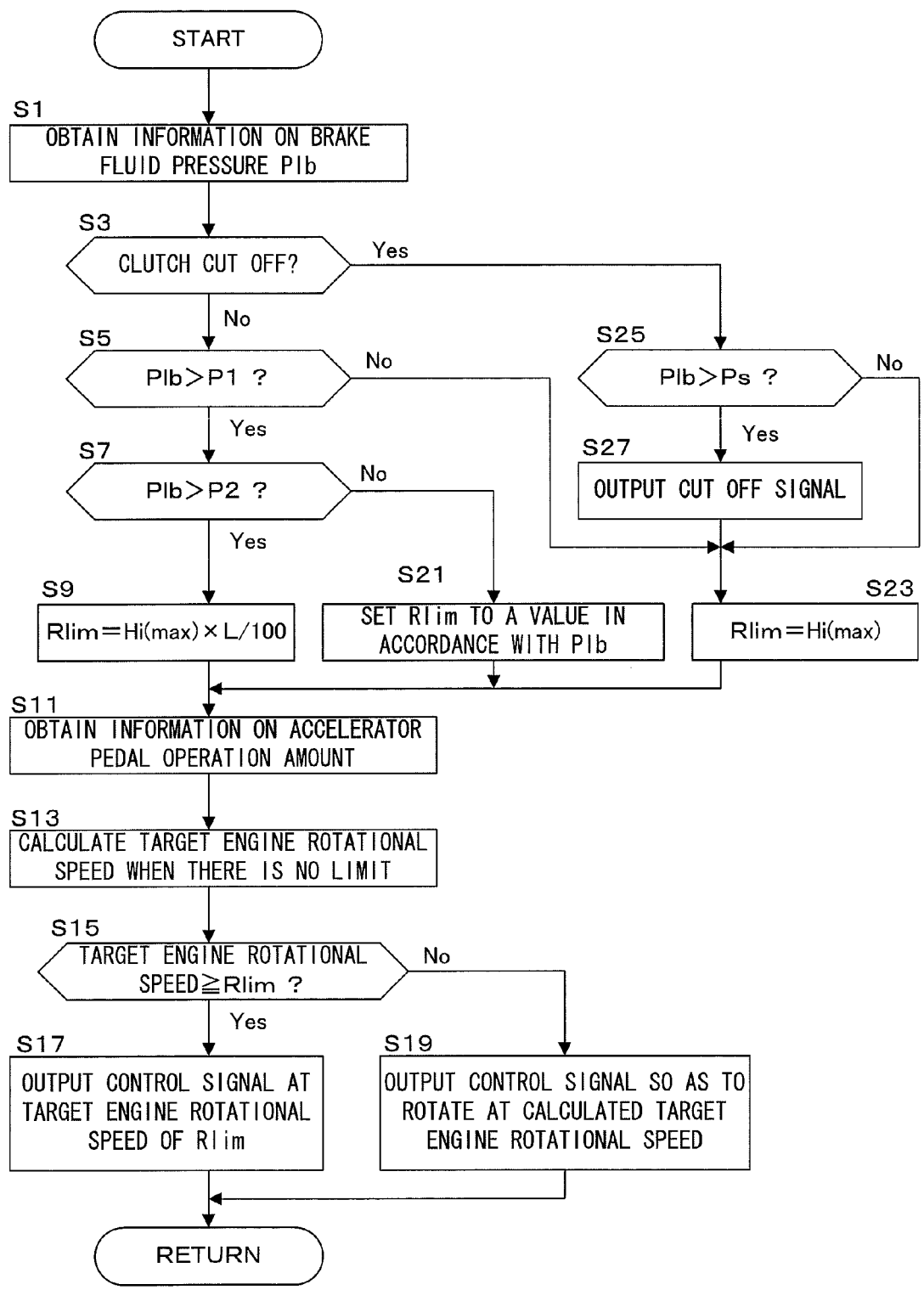
[FIG. 10] A flowchart showing operations of rotational speed control processing of the engine 1 in the wheel loader 100 of the present embodiment.

FIG. 10 is a flowchart showing operations of rotational speed control processing of the engine 1 in the wheel loader 100 of the present embodiment. When an ignition switch (not shown in the figures) of the wheel loader 100 is turned on, a program for performing processing shown in FIG. 10 is started-up and executed by the controller 10 repeatedly. In a step S1, information on the brake fluid pressure Plb detected by the pressure sensor 33 is obtained, and the flow of control proceeds to a step S3. In the step S3, a decision is made as to whether or not the clutch cut off selection switch 9 has been set so as to perform clutch cut off.

If a negative decision is made in the step S3, the flow of control proceeds to a step S5, where a decision is made as to whether or not the brake fluid pressure Plb obtained in the step S1 has exceeded the predetermined pressure value P1. If a positive decision is made in the step S5, the flow of control proceeds to a step S7, where a decision is made as to whether or not the brake fluid pressure Plb obtained in the step S1 has exceeded the predetermined pressure value P2. If a positive decision is made in the step S7, the flow of control proceeds to a step S9, where the engine maximum speed limit Rlim is set to a value obtained by multiplying the Hi (max) by L/100, and then the flow of control proceeds to a step S11. In the step S11, information on an operation amount of the accelerator pedal 12 detected by the pedal operation amount detector 12a is obtained, and the flow of control proceeds to a step S13.

In the step S13, based upon the operation amount of the accelerator pedal 12 obtained in the step S11, a target engine rotational speed when the engine maximum speed limit Rlim is not limited is calculated. For example, information on a relationship as shown in FIG. 8 between the depressing amount of the accelerator pedal 12 and the target engine rotational speed when the engine maximum speed limit Rlim is not limited is stored in the ROM of the controller 10. In the step S13, based upon the information stored in the ROM and the operation amount of the accelerator pedal 12 obtained in the step S11, the target engine rotational speed when the engine maximum speed limit Rlim is not limited is calculated.

Upon execution of the step S13, the flow of control proceeds to a step S15, where a decision is made as to whether or not the target engine rotational speed calculated in the step S13 is equal to or greater than the engine maximum speed limit Rlim. If a positive decision is made in the step S15, the flow of control proceeds to a step S17, where a control signal is output to the engine 1 so that the target engine rotational speed is set to the engine maximum speed limit Rlim, and the flow of control returns. If a negative decision is made in the step S15, the flow of control proceeds to a step S19, where a control signal is output to the engine 1 so that the engine 1 rotates at the target engine rotational speed calculated in the step S13, and the flow of control returns.

If a negative decision is made in the step S7, the flow of control proceeds to a step S21, where the engine maximum speed limit Rlim is set to a value in accordance with the brake fluid pressure Plb obtained in the step S1, i.e., as shown in FIG. 7, the engine maximum speed limit Rlim is set to a value prorated in accordance with the brake fluid pressure Plb between 100 (%) (i.e., Hi (max)) and L (%), and then the flow of control proceeds to the step S11.

If a negative decision is made in the step S5, the flow of control proceeds to a step S23, where the engine maximum speed limit Rlim is set to the Hi (max), and then the flow of control proceeds to the step S11.

If a positive decision is made in the step S3, the flow of control proceeds to a step S25, where a decision is made as to whether or not the brake fluid pressure Plb obtained in the step S1 has exceeded the brake fluid pressure cut off threshold value Ps described above. If a positive decision is made in the step S25, the flow of control proceeds to a step S27, where the cut off signal described above is output to the transmission control device 20, and then the flow of control proceeds to the step S23. If a negative decision is made in the step S25, the flow of control proceeds to the step S23.

The following operations and advantageous effects can be achieved according to the present embodiment.

(1) It is arranged that upon detection of an approach to an object to be approached, an upper limit of the number of rotations of the engine 1 is restricted. Due to this, when approaching a dump truck or the like to load sand and the like, pitching associated with clutch cut off is prevented by not performing clutch cut off, so that the wheel loader 100 can move smoothly, and power loss at the torque converter 2 occurring due to not performing clutch cut off and load on the brake units 5a can be reduced.

(2) It is arranged that upon making a decision that the clutch cut off selection switch 9 has been set so as not to perform clutch cut off and the brake fluid pressure Plb has exceeded the predetermined pressure value P1, it is determined that the vehicle is approaching the object to be approached. This allows a simple configuration to detect whether or not the vehicle is approaching to an object to be approached, thereby reducing cost. In addition, failure and malfunction can also be reduced, thereby improving reliability in making a decision as to whether or not the vehicle is approaching an object to be approached.

(3) It is arranged that the engine maximum speed limit Rlim is reduced gradually as the brake fluid pressure Plb detected by the pressure sensor 33 becomes higher. This prevents the bucket 112 from being sharply reduced in lifting speed and the wheel loader 100 from being sharply reduced in travel driving force when loading sand and the like into a dump truck, thereby inhibiting discomfort in the uplift operation of the bucket 112 and pitching of the wheel loader 100.

(4) It is arranged that the engine maximum speed limit Rlim is limited only when the brake fluid pressure Plb detected by the pressure sensor 33 exceeds the predetermined pressure value P1. This prevents the engine maximum speed limit Rlim from being reduced due to a slight speed adjustment by the brake operation or the like. In this manner the impact on the lifting speed of the bucket 112 and the travel driving force of the wheel loader 100 can be minimized and work efficiency is not compromised.

—Variation 1—

While in the above explanation, it is arranged that a decision is made as to whether or not the vehicle is approaching an object to be approached based upon a selection state of the clutch cut off selection switch 9 and the brake fluid pressure Plb, the present invention is not limited thereto.

Figure 11:
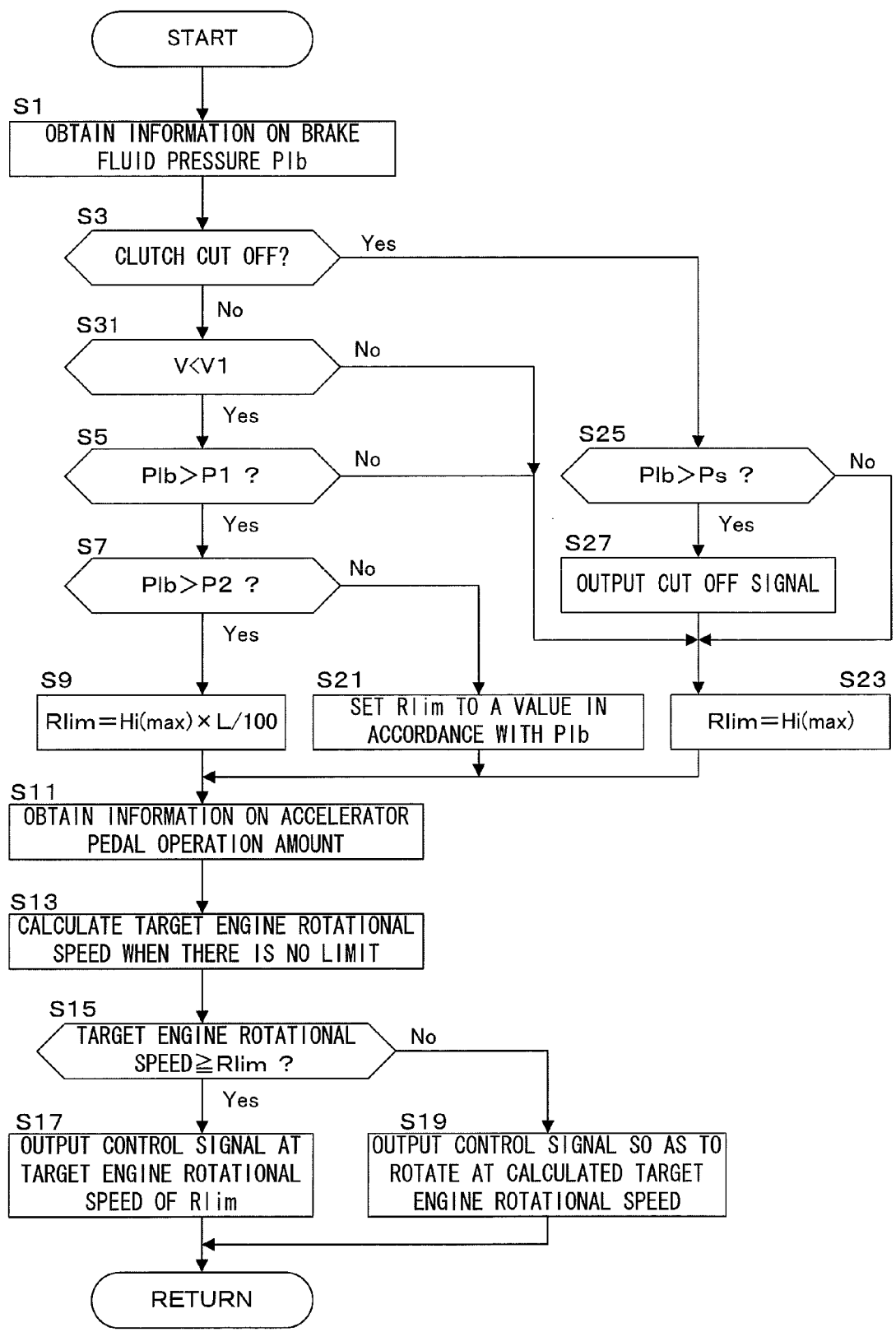
[FIG. 11] A flowchart showing a variation 1 of operations of rotational speed control processing of the engine 1 in the wheel loader 100 of the present embodiment.

FIG. 11 is a flowchart showing the variation 1 of operations of rotational speed control processing of the engine 1 in the wheel loader 100 of the present embodiment.

A difference between the flowchart presented in FIG. 11 and the flowchart presented in FIG. 10 lies in a step S31 added between the step S3 and the step S5.

More specifically, in a state where the clutch cut off selection switch 9 is set in the step S3 so that clutch cut off is not performed, a decision is made in the step S31 as to whether or not the travel speed of the wheel loader 100 is equal to or less than a predetermined speed V1. The predetermined speed V1 is, for instance, 5 km/h. If a positive decision is made in the step S31, the flow of control proceeds to the step S5, where a decision is made as to whether or not the brake fluid pressure Plb obtained in the step S1 has exceeded the predetermined pressure value P1. If a negative decision is made in the step S31, the flow of control proceeds to the step S23.

The processing in and after the step S5 and in and after the step S23 is the same as that in the flowchart presented in FIG. 10.

In the flowchart shown in FIG. 11, a decision is made as to whether or not the vehicle is approaching an object to be approached based upon a selection state of the clutch cut off selection switch 9, the travel speed of the wheel loader 100, and the brake fluid pressure Plb, thereby not restricting the number of rotations of the engine when the wheel loader 100 is increased in travel speed on a downhill slope or the like, and thus extending the range of application.

—Variation 2—

Figure 12:
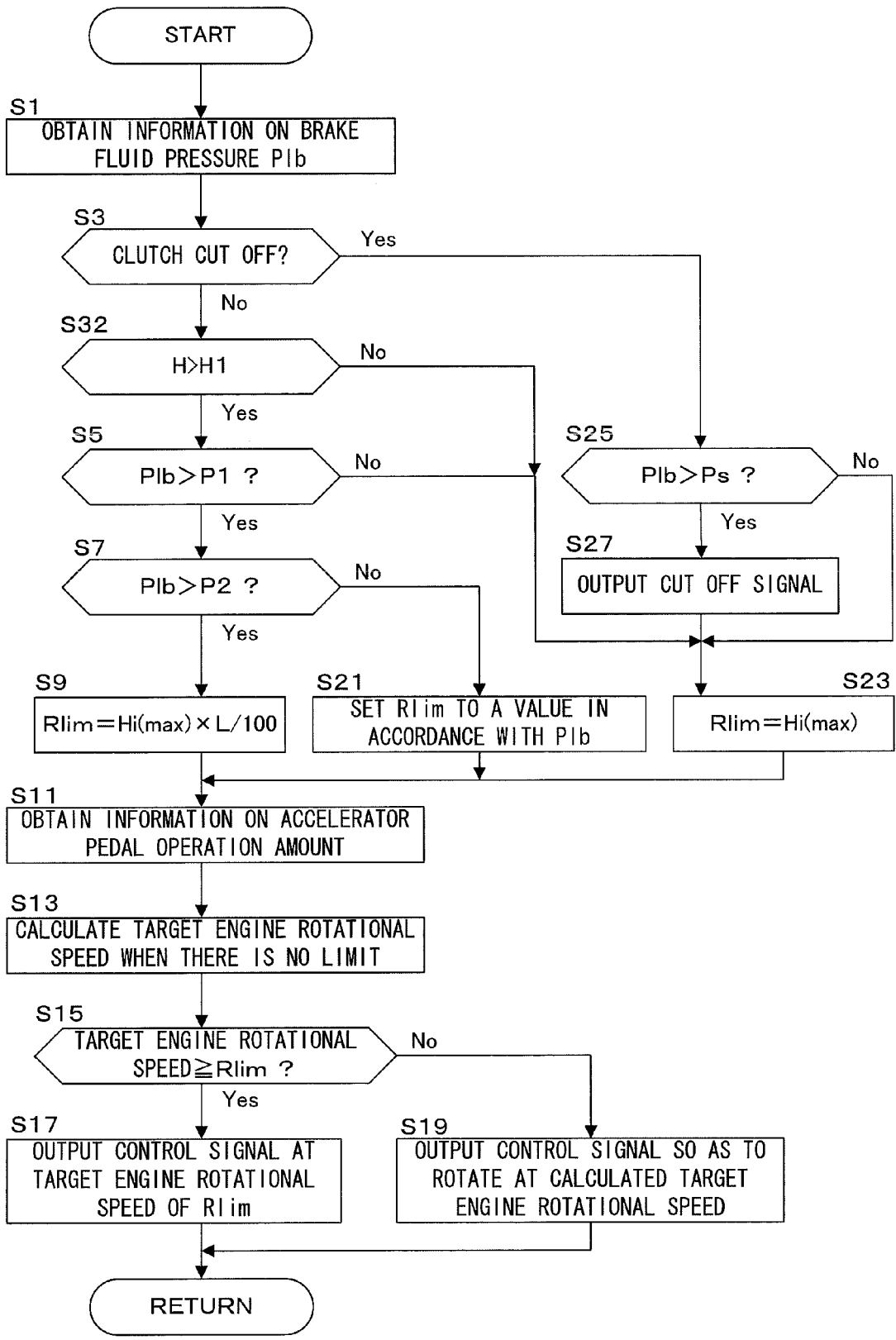
[FIG. 12] A flowchart showing a variation 2 of operations of rotational speed control processing of the engine 1 in the wheel loader 100 of the present embodiment.

FIG. 12 is a flowchart showing the variation 2 of operations of rotational speed control processing of the engine 1 in the wheel loader 100 of the present embodiment.

A difference between the flowchart presented in FIG. 12 and the flowchart presented in FIG. 10 lies in a step S32 added between the step S3 and the step S5.

More specifically, when the clutch cut off selection switch 9 is set in the step S3 so that clutch cut off is not performed, a decision is made in the step S32 as to whether or not a height H of the bucket 112 is equal to or greater than a predetermined height H1. The predetermined height H1 is set as, for example, the height of the bucket 112 at the time of maximum reach where the arm 111 is substantially horizontal. The state in which the arm 111 is substantially horizontal is a state in which the center of rotation of the base end of the arm 111 and the center of rotation of the bucket 112 at the front end extend substantially horizontal.

If a positive decision is made in the step S32, the flow of control proceeds to the step S5, where a decision is made as to whether or not the brake fluid pressure Plb obtained in the step S1 has exceeded the predetermined pressure value P1. If a negative decision is made in the step S32, the flow of control proceeds to the step S23.

The processing in and after the step S5 and in and after the step S23 is the same as that in the flowchart presented in FIG. 10.

In the flowchart shown in FIG. 12, a decision is made as to whether or not the vehicle is approaching an object to be approached based upon a selection state of the clutch cut off selection switch 9, the height of the bucket 112, and the brake fluid pressure Plb, thereby not restricting the number of rotations of the engine when the bucket 112 is far away from the object to be approached to be approached or the like, and thus improving work efficiency.

It is to be noted that while in the above explanation, it is arranged that a decision is made as to whether or not the vehicle is approaching an object to be approached based upon the brake fluid pressure Plb detected by the pressure sensor 33, the present invention is not limited thereto. it may be arranged that a decision is made as to whether or not the vehicle is approaching an object to be approached based upon any information (parameter) related to the magnitude of braking force, e.g., an operation amount (pedal stroke or pedal angle) of the brake pedal 31 detected by the pedal operation amount detector 31a, in place of the brake fluid pressure Plb.

Figure 13:
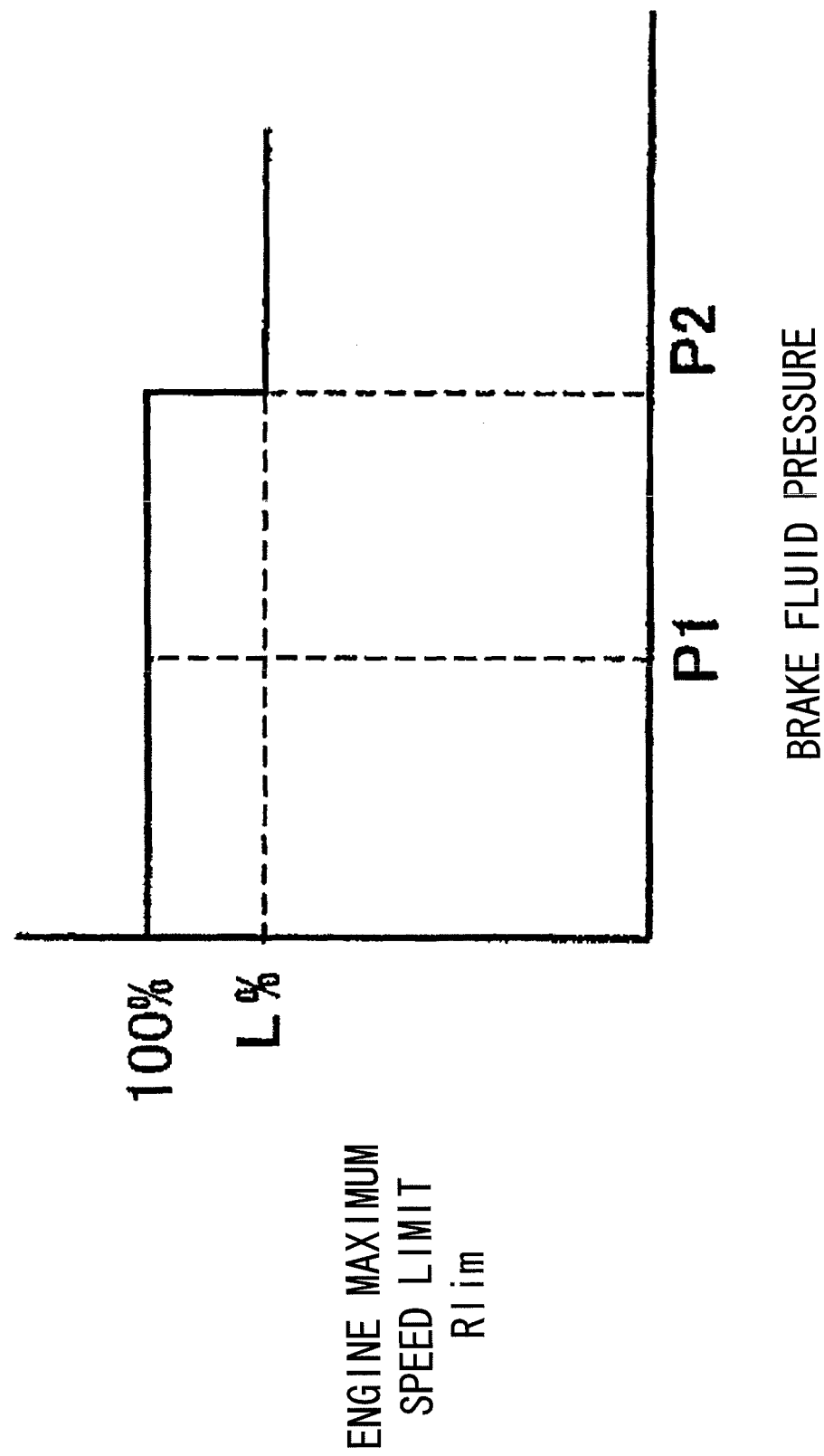
[FIG. 13] A graph showing a variation of a relationship between the brake fluid pressure Plb and the maximum engine speed limit Rlim.

In addition, while in the above explanation, it is arranged that if the brake fluid pressure Plb exceeds the predetermined pressure value P1, the engine maximum speed limit Rlim is set to a value prorated in accordance with the brake fluid pressure Plb between 100 (%) (i.e., Hi (max)) and L (%), the present invention is not limited thereto. For example, as shown in FIG. 13, it may be arranged that if the brake fluid pressure Plb is equal to or less than the predetermined pressure value P2, the engine maximum rotational limit speed Rlim is set to 100 (%), and if the brake fluid pressure Plb exceeds the predetermined pressure value P2, the engine maximum rotational limit speed Rlim is set to L (%). It is to be noted that in this case, it is preferable that the engine maximum speed limit Rlim is not set to L (%) immediately after the brake fluid pressure Plb exceeds the predetermined pressure value P2 but gradually reduced from 100 (%) to L (%) over time (e.g. approximately 2 to 3 seconds) when the brake fluid pressure Plb exceeds the predetermined pressure value P2. This is to inhibit pitching of the wheel loader 100 due to a rapid decrease in rotational speed of the engine 1.

In addition, while in the above explanation, the transmission 3 has four selectable speed steps, the present invention is not limited thereto and it may have three speed steps or may have five or more speed steps. While in the above explanation, the wheel loader 100 is explained as an example of a working vehicle, the present invention is not limited thereto and it may be another working vehicle such as a forklift.

In addition, the embodiment described above and the variations may be combined.

The present invention is not limited to the embodiment described above and includes engine speed control devices for an industrial vehicle with a variety of structures including an approach detector that detects an approach of an industrial vehicle to an object to be approached and an engine speed controller that restricts an upper limit of the number of rotations of an engine when the approach detector detects an approach of the industrial vehicle to an object to be approached.

The disclosure of the following priority application is herein incorporated by reference: Japanese Patent Application No. 2009-144093

The invention claimed is:

1. An engine speed control device for an industrial vehicle, comprising:
   a braking force information obtaining unit that obtains information related to a magnitude of braking force of the industrial vehicle;
   a clutch cut off control device that controls engagement and release of a forward clutch and a reverse clutch so as to release the forward clutch and the reverse clutch when it is decided that the braking force is equal to or greater than a first predetermined braking force based on the information obtained by the braking force information obtaining unit;
   a selector that selects whether or not to allow the clutch cut off control device to release the forward clutch and the reverse clutch;
   an accelerator pedal that is operated to change a rotation speed of an engine between a minimum rotation speed and a maximum rotation speed depending on an operation amount of the accelerator pedal;
   an approach detector that detects that the industrial vehicle has approached an object when the forward clutch provided in a transmission of the engine of the industrial vehicle is in a connected state and it is decided that the braking force of the industrial vehicle is equal to or greater than a second predetermined braking force; and an engine speed controller that: (a) restricts an upper limit of the rotation speed of the engine instructed by the accelerator pedal by gradually reducing the upper limit of the rotation speed of the engine to a rotation speed that is smaller than the maximum rotation speed when the selector selects not releasing the forward clutch and the reverse clutch and the approach detector detects that the industrial vehicle has approached the object, and (b) controls the engine to rotate at the rotation speed instructed by the accelerator pedal without reducing the upper limit of the rotation speed of the engine when the selector selects not releasing the forward clutch and the reverse clutch and the approach detector determines that the forward clutch provided in the transmission of the engine of the industrial vehicle is in the connected state and the braking force of the industrial vehicle is smaller than the second predetermined braking force.

2. The engine speed control device for an industrial vehicle according to claim 1, wherein:
the approach detector determines that the industrial vehicle has approached the object if the forward clutch provided in the transmission of the engine of the industrial vehicle is in the connected state and it is decided that a travel speed of the industrial vehicle is equal to or less than a predetermined speed and that the braking force of the industrial vehicle is equal to or greater than the second predetermined braking force.

3. The engine speed control device for the industrial vehicle according to claim 1, wherein:
the approach detector determines that the industrial vehicle has approached the object if the forward clutch provided in the transmission of the engine of the industrial vehicle is in the connected state and it is decided that a height of a working machine device provided in the industrial vehicle is equal to or greater than a predetermined height and that the braking force of the industrial vehicle is equal to or greater than the second predetermined braking force.

4. The engine speed control device for the industrial vehicle according to claim 1, wherein:
the engine speed controller restricts the upper limit of the rotation speed of the engine such that the upper limit of the rotation speed of the engine becomes lower with an increase in the braking force.

* * * * *